United States Patent
Jai

(10) Patent No.: US 8,880,910 B2
(45) Date of Patent: Nov. 4, 2014

(54) POWER MANAGEMENT SYSTEM AND METHOD

(75) Inventor: Ben-Chiao Jai, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 676 days.

(21) Appl. No.: 13/204,775

(22) Filed: Aug. 8, 2011

(65) Prior Publication Data

US 2012/0331311 A1 Dec. 27, 2012

(30) Foreign Application Priority Data

Jun. 27, 2011 (TW) .............................. 100122414 A

(51) Int. Cl.
*G06F 1/00* (2006.01)
*G06F 1/26* (2006.01)

(52) U.S. Cl.
CPC ..................................... *G06F 1/266* (2013.01)
USPC .......................................................... 713/300

(58) Field of Classification Search
CPC .................................................... G06F 1/3203
USPC ........................................................ 713/300
See application file for complete search history.

(56) References Cited

U.S. PATENT DOCUMENTS

| | | | |
|---|---|---|---|
| 7,533,281 B2 | 5/2009 | Hsieh | |
| 2006/0082222 A1 | 4/2006 | Pincu et al. | |
| 2009/0241113 A1* | 9/2009 | Seguin et al. | 718/1 |
| 2010/0019575 A1 | 1/2010 | Verges | |

FOREIGN PATENT DOCUMENTS

| | | |
|---|---|---|
| TW | 200632634 | 9/2006 |
| TW | 200707232 | 2/2007 |
| TW | 201006083 | 2/2010 |

OTHER PUBLICATIONS

Server Racks Online, LLC 2010, Jun. 10, 2010, http://www.server-rack-online.com/server-rack-information.html, Server Rack Buying Guide—Server Rack Ordering Info.*

* cited by examiner

*Primary Examiner* — Mohammed Rehman
*Assistant Examiner* — Austin Hicks
(74) *Attorney, Agent, or Firm* — Kirton McConkie; Evan R. Witt

(57) ABSTRACT

A power management system includes a plurality of electronic devices, a power distribution unit, a power management unit and a power control unit. The power distribution unit is connected with the electronic devices for providing electricity to the electronic devices. The power management unit is connected to a network and the electronic devices, so that the electronic devices are connected with the network through the power management unit. The power control unit is connected with the power management unit through the network. The power control unit is configured for controlling the power management unit, thereby sequentially starting the electronic devices.

20 Claims, 4 Drawing Sheets

POWER MANAGEMENT SYSTEM AND METHOD

FIELD OF THE INVENTION

The present invention relates to a power management system and a power management method, and more particularly to a power management system and a power management method applied to a rack cabinet and electronic devices of a data center.

BACKGROUND OF THE INVENTION

With increasing development of information industries and networks, the services provided through networks are becoming more and more appealing in various applications. Recently, with development of high-tech industries, the concepts of the cloud computing technology and the cloud storage device have been emerged, and thus the data center becomes more important. A data center is a facility used to house a plurality of computers, servers or work stations. For providing intensive network applications, the numbers of computers, servers or work stations of the data center need to be increased to exchange and store data.

For protecting the stored data and achieving the stability of the network connection, the data center needs to be periodically shut down for maintenance and repair. After the maintenance and repair tasks are completed, the data center will return to work. However, since the data center has several hundreds or several thousands of computers, servers or work stations, if all of the computers, servers or work stations are simultaneously started, the current is abruptly increased. Under this circumstance, the electronic components within the data center are possibly damaged or have malfunction.

In the current process of allowing the data center to return to work, the electronic devices are manually started in a partition start manner. That is, the computers, servers or work stations within the data center are monitored and controlled by the engineers. The electronic devices are manually started until all of the electronic devices are started. If too many electronic devices are simultaneously started, the risk of causing damage or malfunction of the electronic devices will be increased. The conventional way of starting these electronic devices are labor-intensive and time-consuming, and reduce the effectiveness of risk management.

SUMMARY OF THE INVENTION

The present invention provides a power management system and a power management method for automatically starting electronic devices in a partition start manner, so that the manpower, time and money cost are reduced and the effectiveness of risk management is easily achieved.

The present invention also provides a power management system and a power management method by connecting a power control unit with the local area power management unit through a network, so that the manpower, time and money cost are reduced and the effectiveness of risk management is easily achieved.

In accordance with an aspect of the present invention, there is provided a power management system. The power management system includes a plurality of electronic devices, a power distribution unit, a power management unit and a power control unit. The power distribution unit is connected with the electronic devices for providing electricity to the electronic devices. The power management unit is connected to a network and the electronic devices, so that the electronic devices are connected with the network through the power management unit. The power control unit is in communication with and connected to the power management unit through the network. The power control unit is configured for controlling the power management unit, thereby sequentially starting the electronic devices.

In accordance with another aspect of the present invention, there is provided a power management method. Firstly, a power distribution unit, a power management unit, a power control unit and a plurality of electronic devices are provided. Then, the power distribution unit is connected with the electronic devices, so that electricity is provided from the power distribution unit to the electronic devices. Then, the power management unit is connected to a network and the electronic devices, so that the electronic devices are connected to the network. Afterwards, the power control unit is in communication with and connected to the power management unit through the network. Consequently, the power management unit is controlled by the power control unit to sequentially start the electronic devices.

In accordance with another aspect of the present invention, there is provided a power management system includes a plurality of electronic devices, a power distribution unit, a power management unit and a power control unit. The power distribution unit is connected with the electronic devices for providing electricity to the electronic devices. The power management unit is connected to a network and the electronic devices for allowing the electronic devices to connect with the network through the power management unit. The power control unit is connected with the power management unit through the network and configured for controlling the power management unit. In response to a command issued from the power control unit or the power management unit, the electronic devices are successively started.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
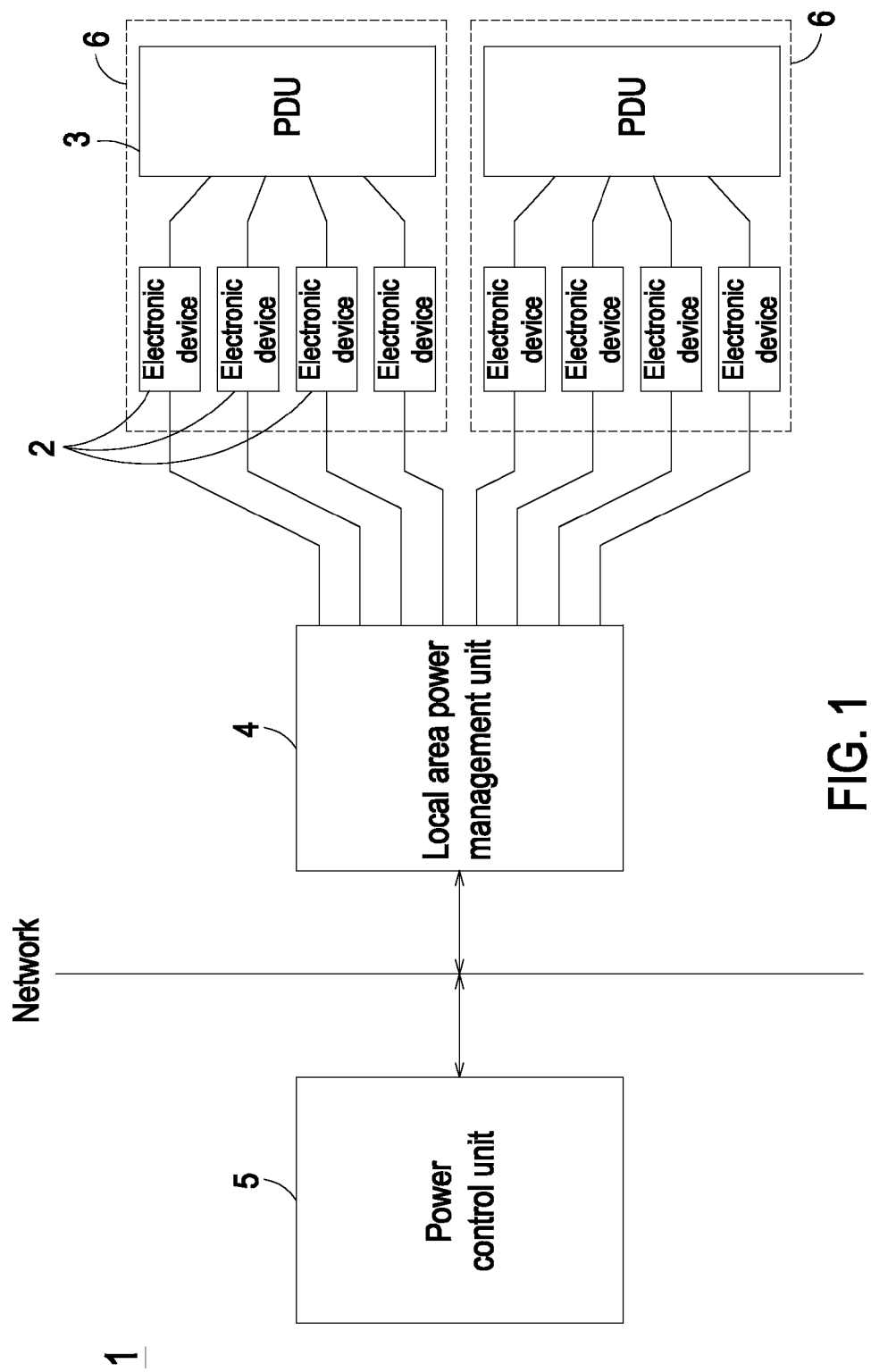
FIG. 1 is a schematic block diagram illustrating the architecture of a power management system according to an embodiment of the present invention.

FIG. 1 is a schematic block diagram illustrating the architecture of a power management system according to an embodiment of the present invention. As shown in FIG. 1, the power management system 1 at least comprises a plurality of electronic devices 2, a power distribution unit (PDU) 3, a local area power management unit 4 and a power control unit 5. The power distribution unit 3 is connected with the electronic devices 2 through electrical connectors and power cords (see FIG. 2), so that electricity may be transmitted to the electronic devices 2. The local area power management unit 4 is connected to the network. In addition, the local area power management unit 4 is configured to control and start the electronic devices 2. When the electronic devices 2 are started, the local area power management unit 4 is in communication with the electronic devices 2, so that the electronic devices 2 are in communication with the network. An example of the network includes but is not limited to an internet, a local area network (LAN), a wireless local area network (WLAN), or the like. The power control unit 5 is in communication with and connected to the local area power management unit 4 through the network for controlling the local area power management unit 4, thereby further controlling the electronic devices 2. In response to the commands issued from the power control unit 5 and the local area power management unit 4, these electronic devices 2 are successively and individually started. In an embodiment, these electronic devices 2 are started one by one. Alternatively, two or more electronic devices 2 are started once. For example, one, two or three electronic devices 2 are started at each time until all of the electronic devices 2 are successively started. Since these electronic devices 2 are automatically started in a partition start manner, the manpower, time and money cost are reduced and the effectiveness of risk management is easily achieved.

Figure 2:
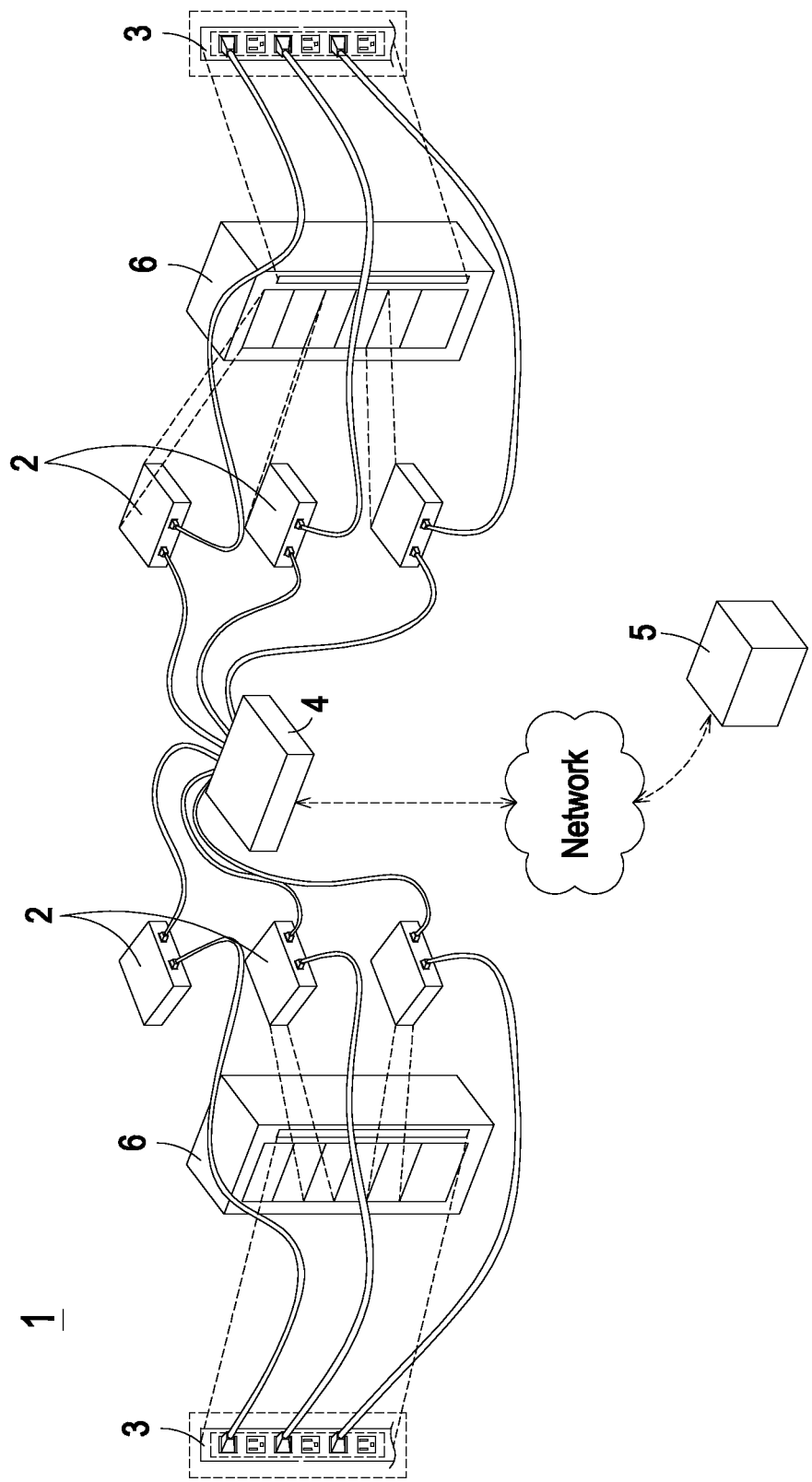
FIG. 2 is a schematic view illustrating the power management system according to an embodiment of the present invention.

FIG. 2 is a schematic view illustrating the power management system according to an embodiment of the present invention. Please refer to FIGS. 1 and 2. The power management system 1 further comprises a rack cabinet 6. The electronic devices 2 and the power distribution unit 3 are accommodated within the rack cabinet 6. The electronic devices 2 are swappable to be installed in the rack cabinet 6. Examples of the electronic devices 2 include but are not limited to computers, servers or work stations. The power distribution unit 3 may be fixed on the rack cabinet 6 by screwing or locking means. Alternatively, the power distribution unit 3 may be embedded in the rack cabinet 6. Through electrical connectors and power cords, the power distribution unit 3 is connected with the electronic devices 2 and provides electricity to the electronic devices 2.

Moreover, the electronic devices 2 are connected with the local area power management unit 4 through power cords and electrical connectors. Examples of the electrical connectors include but are not limited to RJ-45 connectors. Moreover, the local area power management unit 4 is configured to control and start the electronic devices 2 by using a wakeup on LAN (WOL) mechanism. When the electronic devices 2 are started, the local area power management unit 4 is connected with the electronic devices 2, so that the electronic devices 2 are in communication with the network.

In this embodiment, the media access control addresses (MAC addresses) corresponding to the electronic devices 2 are acquired and stored by the power management system 1 through the network connection with the local area power management unit 4 or the power control unit 5. Moreover, by executing a management program in the local area power management unit 4 or the power control unit 5, the electronic devices 2 with the corresponding media access control addresses are sequentially started through the wakeup on LAN (WOL) mechanism. Through the wakeup on LAN (WOL) mechanism, a control command issued from the power control unit 5 is transmitted to the local area power management unit 4, and a start command is transmitted to the electronic devices 2 through the local area power management unit 4, so that the electronic devices are sequentially and individually started. In an embodiment, the start command is generated by executing a management program in the local area power management unit 4 or the power control unit 5. Moreover, the start command is transmitted to the electronic devices 2 through the local area power management unit 4.

In some embodiment, the electricity is continuously provided from the power distribution unit 3 to the electronic devices 2. In other words, after the rack cabinet 6 of the power management system 1 has been repaired, the electronic devices 2 within the rack cabinet 6 are not simultaneously started by operating the switch of the power distribution unit 3. Whereas, through the wakeup on LAN (WOL) mechanism and in response to the commands issued from the local area power management unit 4 and the power control unit 5, these electronic devices 2 are successively and individually started. In an embodiment, these electronic devices 2 are started one by one. Alternatively, two or more electronic devices 2 are started once. Since these the electronic devices 2 are automatically started in a partition start manner, the manpower, time and money cost are reduced and the effectiveness of risk management is easily achieved.

Figure 3:
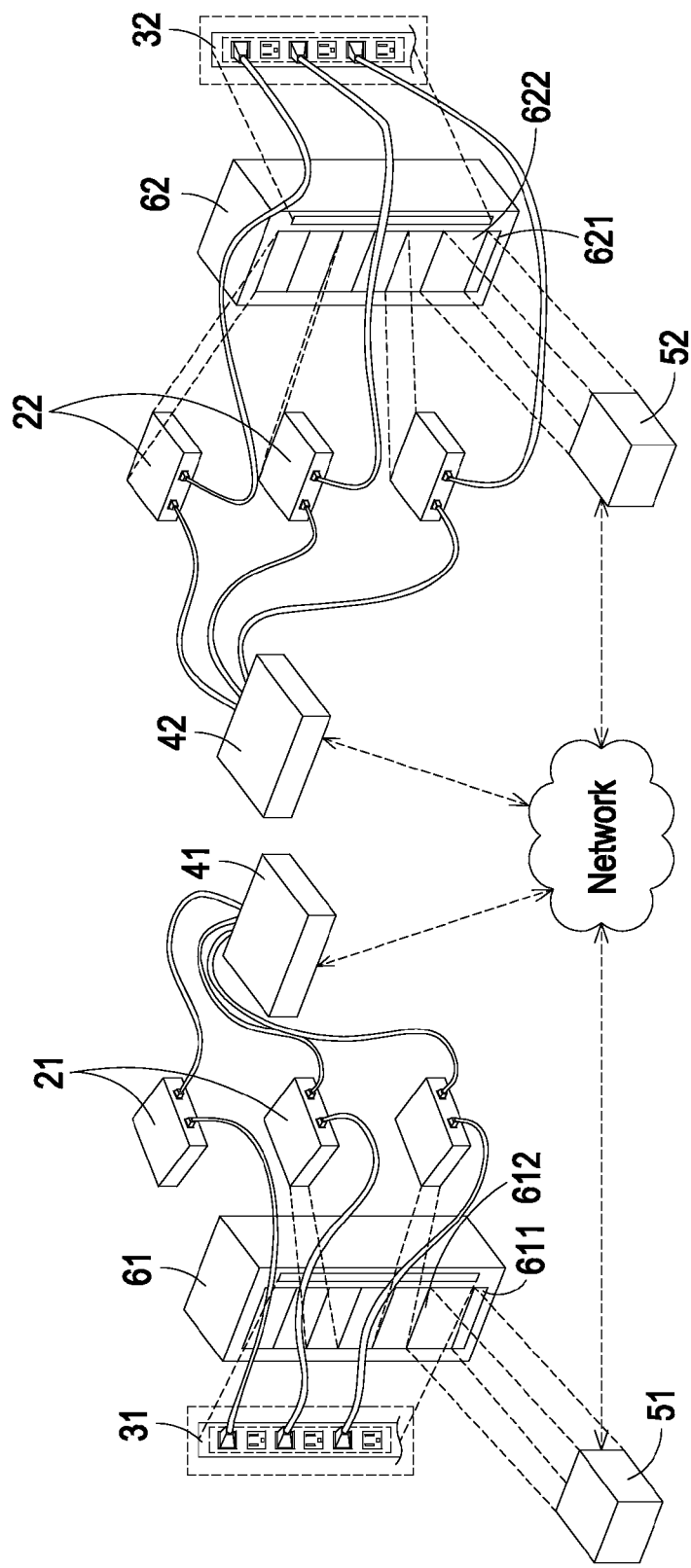
FIG. 3 is a schematic view illustrating the power management system according to another embodiment of the present invention.

FIG. 3 is a schematic view illustrating the power management system according to another embodiment of the present invention. Please refer to FIGS. 1 and 3. The power management system 1 comprises a plurality of first electronic devices 21, a first power distribution unit 31, a first local area power management unit 41, a first power control unit 51, a first rack cabinet 61, a plurality of second electronic devices 22, a second power distribution unit 32, a second local area power management unit 42, a second power control unit 52 and a second rack cabinet 62. The relationship between the first electronic devices 21, the first power distribution unit 31, the first local area power management unit 41, the first power control unit 51 and the first rack cabinet 61 and the relationship between the second electronic devices 22, the second power distribution unit 32, the second local area power management unit 42, the second power control unit 52 and the second rack cabinet 62 are similar to those of FIG. 2, and are not redundantly described herein.

The first local area power management unit 41 and the first power control unit 51 are swappable to be accommodated within a first receptacle 611 and a second receptacle 612 of the first rack cabinet 61, respectively. The second local area power management unit 42 and the second power control unit 52 are swappable to be accommodated within a first receptacle 621 and a second receptacle 622 of the second rack cabinet 62, respectively. In other words, all components of the power management system 1 may be installed within the first rack cabinet 61 and the second rack cabinet 62. Consequently, the electronic devices with the same rack cabinet may be sequentially and individually started.

Figure 4:
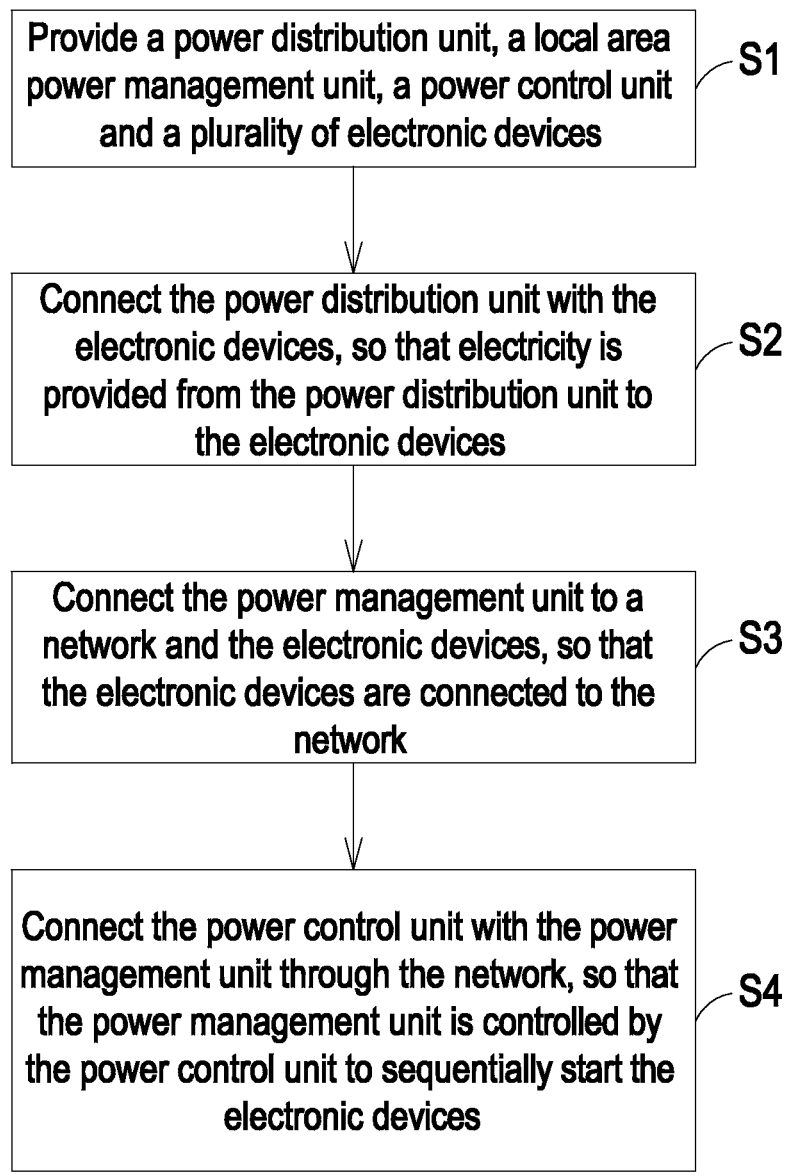
FIG. 4 is a flowchart illustrating a power management method according to another embodiment of the present invention.

FIG. 4 is a flowchart illustrating a power management method according to another embodiment of the present invention. Please refer to FIGS. 1 and 4. First of all, as shown in the step S1, a power distribution unit 3, a local area power management unit 4, a power control unit 5 and a plurality of electronic devices 2 are provided. The local area power management unit 4 comprises at least one device selected from a group consisting of a hub, a switch hub, an IP router and a wireless access point. Examples of the electronic devices 2 include but are not limited to computers, servers or work stations. Then, in the step S2, the power distribution unit 3 is connected with the electronic devices 2 through electrical connectors and power cords for providing electricity to the electronic devices 2. Moreover, the electricity is continuously provided from the power distribution unit 3 to the electronic devices 2. Then, as shown in FIG. S3, the local area power management unit 4 is connected to the network and configured to control and start the electronic devices 2. When the electronic devices 2 are started, the local area power management unit 4 is connected with the electronic devices 2, so that the electronic devices 2 are in communication with the network. An example of the network includes but is not limited to an internet, a local area network (LAN), a wireless local area network (WLAN), or the like. In some embodiments, the network connection is established through the local area power management unit 4. That is, the connection of the electronic devices 2 to the network is established through the local area power management unit 4. Then, in the step S4, the power control unit 5 is connected with the local area power management unit 4 through the network for controlling the local area power management unit 4, thereby further controlling the electronic devices 2. In response to the commands issued from the power control unit 5 and the local area power management unit 4, these electronic devices 2 are successively and individually started. In an embodiment, these electronic devices 2 are started one by one. Alternatively, two or more electronic devices 2 are started once. For example, one, two or three electronic devices 2 are started at each time until all of the electronic devices 2 are successively started.

In the power management system and the power management method of the present invention, the power control unit is in communication with and connected to the local area power management unit through the network for controlling the local area power management unit, thereby further controlling the electronic devices. Since these the electronic devices are automatically started in a partition start manner, the manpower, time and money cost are reduced and the effectiveness of risk management is easily achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power management system, comprising:
   a plurality of electronic devices;
   a power distribution unit connected with said electronic devices for providing electricity to said electronic devices;
   a power management unit connected to a network and said electronic devices, so that said electronic devices are connected with said network through said power management unit; and
   a power control unit connected with said power management unit through said network; and
   a rack cabinet comprising a first receptacle and a second receptacle, wherein said electronic devices are swappable to be installed in said rack cabinet, said power distribution unit is disposed in said rack cabinet, said power management unit is accommodated within said first receptacle, and said power control unit is accommodated within said second receptacle;
   wherein said power control unit is configured for controlling said power management unit, thereby individually starting said electronic devices in order according to the individual electronic device's receptacle position on the rack with respect to the first receptacle and the second receptacle.

2. The power management system according to claim 1, wherein said power management unit is configured to control and start said electronic devices, wherein when said electronic devices are started, said power management unit is connected with said electronic devices.

3. The power management system according to claim 2, wherein said power management unit is configured to control and start said electronic devices by using a wakeup on LAN (WOL) mechanism.

4. The power management system according to claim 3, wherein through connection between said power management unit or said power control unit and said network, the media access control addresses corresponding to said electronic devices are acquired and stored, so that said electronic devices with said corresponding media access control addresses are successively started by said wakeup on LAN mechanism.

5. The power management system according to claim 3, wherein through said wakeup on LAN mechanism, a control command issued from said power control unit is transmitted to said power management unit, and a start command is transmitted to said electronic devices through said power management unit, so that said electronic devices are sequentially started.

6. The power management system according to claim 1, wherein said network is one of an internet, a local area network and a wireless local area network.

7. The power management system according to claim 1, wherein said power distribution unit is screwed or embedded in said rack cabinet.

8. The power management system according to claim 1, wherein said power management unit is swappable to be accommodated within said first receptacle, and said power control unit is swappable to be accommodated within said second receptacle.

9. The power management system according to claim 1, wherein said electricity is continuously provided from said power distribution unit to said electronic devices.

10. The power management system according to claim 1, wherein said power management unit comprises at least one device selected from a group consisting of a hub, a switch hub, an IP router and a wireless access point.

11. The power management system according to claim 1, wherein said electronic devices are computers, servers or work stations.

12. The power management system according to claim 1, wherein the connection of said electronic devices to said network is established through said power management unit.

13. A power management method, comprising steps of:
   providing a power distribution unit, a power management unit, a power control unit, a plurality of electronic devices and a rack cabinet comprising a first receptacle and a second receptacle, wherein said electronic devices are swappable to be installed in said rack cabinet, said power distribution unit is disposed in said rack cabinet, said power management unit is accommodated within said first receptacle, and said power control unit is accommodated within said second receptacle;
   connecting said power distribution unit with said electronic devices, so that electricity is provided from said power distribution unit to said electronic devices;
   connecting said power management unit to a network and said electronic devices, so that said electronic devices are connected to said network; and connecting said power control unit with said power management unit through said network, so that said power management unit is controlled by said power control unit to individually start said electronic devices in order according to the individual electronic device's receptacle position on the rack with respect to the first receptacle and the second receptacle.

14. The power management method according to claim 13, wherein said power management unit is configured to control and start said electronic devices by using a wakeup on LAN (WOL) mechanism.

15. The power management method according to claim 14, wherein through connection between said power management unit or said power control unit and said network, the media access control addresses corresponding to said electronic devices are acquired and stored, so that said electronic devices with said corresponding media access control addresses are sequentially started by said wakeup on LAN mechanism.

16. The power management method according to claim 15, wherein through said wakeup on LAN mechanism, a control command issued from said power control unit is transmitted to said power management unit, and a start command is transmitted to said electronic devices through said power management unit, so that said electronic devices are sequentially started.

17. The power management method according to claim 13, wherein said power management unit comprises at least one device selected from a group consisting of a hub, a switch hub, an IP router and a wireless access point.

18. The power management method according to claim 13, wherein said electronic devices are computers, servers or work stations.

19. A power management system, comprising:
a plurality of electronic devices;
a power distribution unit connected with said electronic devices for providing electricity to said electronic devices;
a power management unit connected to a network and said electronic devices for allowing said electronic devices to connect with said network therethrough;
a power control unit connected with said power management unit through said network and configured for controlling said power management unit; and
a rack cabinet comprising a first receptacle and a second receptacle, wherein said electronic devices are swappable to be installed in said rack cabinet, said power distribution unit is disposed in said rack cabinet, said power management unit is accommodated within said first receptacle, and said power control unit is accommodated within said second receptacle; and
in response to a command issued from said power control unit and said power management unit, said electronic devices are individually started in order according to the individual electronic device's receptacle position on the rack with respect to the first receptacle and the second receptacle.

20. The power management system according to claim 19, wherein said power management unit is configured to control and start said electronic devices by using a wakeup on LAN (WOL) mechanism.

* * * * *